Jan. 12, 1965  M. W. HUBER  3,165,182
HYDRAULIC CLUTCH
Filed Dec. 19, 1960  2 Sheets-Sheet 1
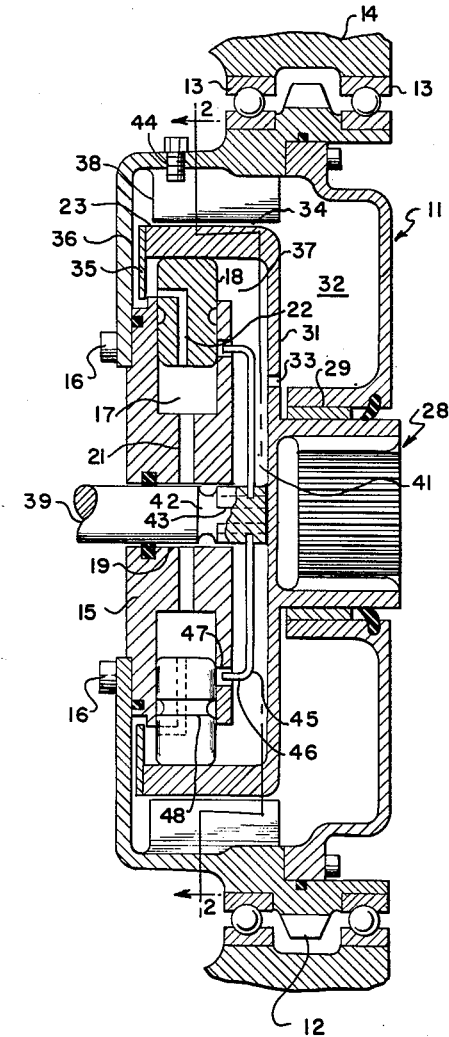
FIG. I.
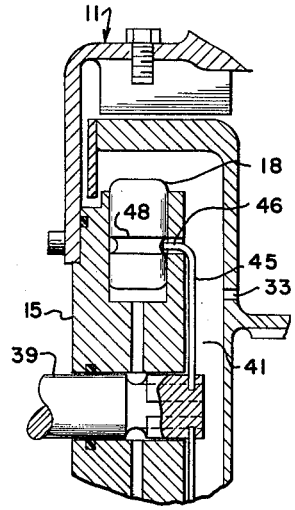
FIG. 4.
INVENTOR
MATTHEW W. HUBER
BY Dodge and Sons
ATTORNEYS Jan. 12, 1965    M. W. HUBER    3,165,182
HYDRAULIC CLUTCH
Filed Dec. 19, 1960    2 Sheets-Sheet 2

INVENTOR
MATTHEW W. HUBER

BY Dodge and Sons
ATTORNEYS

United States Patent Office 3,165,182
Patented Jan. 12, 1965

3,165,182
HYDRAULIC CLUTCH
Matthew W. Huber, Watertown, N.Y., assignor to The New York Air Brake Company, a corporation of New Jersey
Filed Dec. 19, 1960, Ser. No. 76,735
4 Claims. (Cl. 192—59)

This invention relates to hydraulic clutches of the reciprocating piston type in which the pistons move in directions transverse to the axis of rotation.

In clutches of this type, either the driving member or the driven member usually contains an oil reservoir which encircles its axis of rotation and which is provided with inlet and outlet ports adjacent its inner and outer peripheries, respectively. When the member containing the reservoir is rotated, the oil in the reservoir is subjected to centrifugal force thereby producing a pressure head at the outlet port. This head is used to force oil to the cylinder bores and thus tends to maintain them liquid-filled.

These devices operate satisfactorily as long as the radius of the liquid level in the reservoir (measured from the axis of rotation) is less than the radius of the inlet ports of the cylinder bores. However, once the radius of the liquid level becomes greater than the radius of the inlet ports, the device ceases to operate because the inlet ports become starved of fluid. Since it is practically impossible to fill one of these clutches completely with oil, and since any hydraulic clutch will leak some during operation, the service life between fillings has been limited.

The object of this invention is to provide an hydraulic clutch in which maximum use is made of any oil present in the clutch. In accordance with this invention, a pump is located between the outlet from the reservoir and the inlet ports to the various cylinder bores for forcing fluid to those cylinder bores. With this arrangement, the clutch may operate satisfactorily even though the quantity of oil in the reservoir is very small because proper operation is independent of the relationship between the radii of the liquid level in the reservoir and the inlet ports.

The oil which is expelled from the cylinder bores is led through parallel flow paths to the cylinder bore inlet ports; one of these paths including the reservoir and the pump, and the other comprising a reservoir by-pass passage. The provision of the by-pass permits operation even after the liquid in the reservoir is exhausted.

Figure 2:
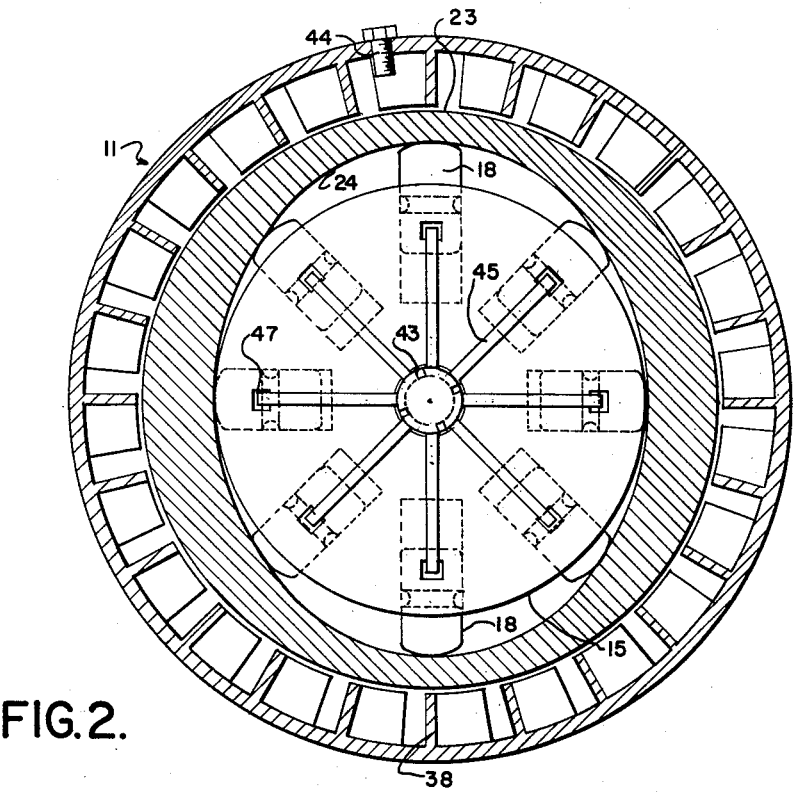
Figure 3:
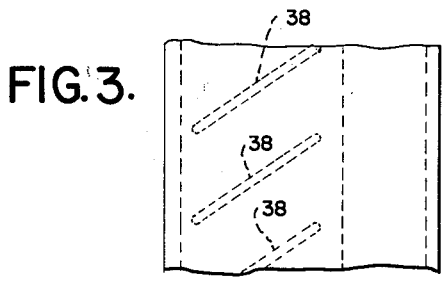

The preferred embodiment of the invention will now be described in detail with reference to the accompanying drawings, in which:

FIG. 1 is an axial sectional view of the hydraulic clutch.
FIG. 2 is a sectional view taken on line 2—2 of FIG. 1.
FIG. 3 is a developed plan view showing a few of the pump impellers.
FIG. 4 is a partial sectional view, similar to FIG. 1, but showing the discharge valve in its open position and the arresting mechanism in its piston-engaging position.

As shown in FIG. 1, the drive member 11 of the clutch comprises a two-part toroidal casing whose outer periphery carries gear teeth 12 and which is supported in bearings 13 in a housing 14. The inner periphery of the casing is partially cut away to receive a coaxial cylinder barrel 15 which is attached to the casing by cap screws 16. The cylinder barrel 15 contains eight radial cylinder bores 17 which receive the reciprocable pistons 18 and which communicate with an axial bore 19 through radial discharge passages 21. Each piston 18 contains an internal inlet passage 22 that is arranged to be opened and closed by the outer edge of the cylinder bore 17 as the piston moves outward and inward in the bore. Therefore, it will be undestood that each piston 18 and the outer edge of its cylinder bore 17 constitute an inlet valve.

The pistons 18 are moved outward by centrifugal force and are moved inward by a cam ring 23 having an inner peripheral surface 24 of elliptical shape. The cam ring 23 is formed in one piece with the splined driven member 28 which is supported in a bearing 29 mounted in the casing of drive member 11. The wall 31 of the driven member and the casing of the drive member define a toroidal reservoir 32 having an inlet passage adjacent its inner periphery defined by an opening 33 through wall 31 and an annular outlet adjacent its outer periphery and leading into the annular supply passage 34 located between cam ring 23 and the casing of drive member 11. Attached to the left face of cam ring 23 (as viewed in FIG. 1) is an annular skirt 35 which is spaced from the adjacent wall of casing 11 to define a supply passage 36 which leads radially inward from the annular supply passage 34 to the space 37 between cam ring 23 and cylinder barrel 15. The space 37 constitutes an inlet manifold. Positioned in passage 34, and formed in one piece with one section of casing 11, are a plurality of pump impellers 38 which are arranged to force fluid from the reservoir 32 through the supply passage 34 to the passage 36 and the space 37.

A discharge valve plunger 39 is mounted for reciprocation in the axial bore 19 of cylinder barrel 15 for controlling communication between the discharge passages 21 and the space 41 located between the opposing faces of cylinder barrel 15 and wall 31. The valve plunger 39 is formed with an annular groove 42 and a plurality of longitudinal slots 43 which intersect the groove and pass through the end surface of the plunger. The radial clearance between the valve plunger 39 and bore 19 is large enough to permit the flow of gas from cylinder bores 17 but not large enough to permit leakage of oil. Consequently, when the plunger 39 is in the position shown in FIG. 1, the pistons 18 are hydraulically locked but gases trapped in the cylinder bores 17 may escape.

During operation, the clutch is charged with oil through the plugged opening 44 and the drive and driven members 11 and 28 are connected with the devices between which power is to be transmitted. As the casing 11 of the drive member rotates, the oil in reservoir 32 is forced radially outward toward the outlet passage 34 thereby producing a pressure head at that point. Centrifugal force also encourages separation of gases entrained in the oil which collect at the inner periphery of the reservoir. Oil in passage 34 is pumped by the impellers 38 through the passage 36 to the space 37. When the discharge valve plunger 39 is in the FIG. 4 position, fluid which enters the cylinder bores 17 through the internal passage 22 on the outward strokes of the pistons 18, is discharged freely from the cylinder bores through the radial passages 21, the groove 42 and the longitudinal passages 43. A portion of this fluid is returned to space 37 directly through the space 41 (which serves as a reservoir by-pass passage), whereas the balance is conveyed to the reservoir 32 through the opening 33 in wall 31. Since the pistons 18 are not loaded at this time, they are free to reciprocate under the combined action of cam 23 and centrifugal force and, therefore, no torque is transmitted to driven member 28.

When the discharge valve plunger 39 is first shifted to the clutch-disengaging position of FIG. 4, the pistons 18 move inward in succession and, when they reach the limit of their travel (i.e., when they are contacting the minimum radius portion of cam surface 24), they are locked in that position by an arresting device. This device comprises a plurality of flat wire springs 45 (there being one spring for each piston) which are carried by the valve plunger 39 and which have inward projections 46 that are received in openings 47 formed in the cylinder barrel 15. These projections 46 extend into annular grooves 48 formed in the pistons when these grooves are aligned with the openings 47. The arresting device is more fully described and claimed in my copending application Serial No. 76,892, filed December 19, 1960, now abandoned.

When the valve plunger 39 is shifted to the clutch-engaging position of FIG. 1, the projections 46 of the arresting device are withdrawn from the grooves 48 and the pistons are allowed to move outward under the action of centrifugal force. As each internal passage 22 is opened, oil under pressure in space 37 is forced into and fills the associated cylinder bore 17. Since the valve plunger 39 now interrupts the flow of oil from radial passages 21, the pistons 18 are prevented from moving inward under the action of the cam surface 24. As a result, the locked pistons form a torque-transmitting connection between the drive member 11 and the driven member 28 and these two members rotate in unison.

As mentioned previously, oil is delivered to the space 37 along two parallel paths; one path comprising the space 41 and the other including a portion of space 41, opening 33, reservoir 32, supply passage 34, and passage 36. Normally both paths are active but, when the oil level in reservoir 32 becomes so low that the impellers 38 are no longer effective, the pressure in space 37 is maintained solely by the thin column of oil in space 41 which is forced outward toward that space by centrifugal force. The provision of the second parallel path defined by the narrow space 41, therefore, permits operation under conditions which ordinarily could not be tolerated.

As stated previously, the drawings and description relate only to the preferred embodiment of the invention. Since many changes can be made in the structure of this embodiment without departing from the inventive concept, the following claims should provide the sole measure of the scope of the invention.

What is claimed is:

1. A hydraulic clutch comprising a rotary drive member; a rotary driven member; a cylinder barrel carried by one of the members and containing a plurality of circumferentially spaced cylinder bores; a piston reciprocable in each cylinder bore; a cam ring carried by the other of said members and having a cam surface encircling the cylinder barrel and in operative engagement with the pistons at their outer ends for moving them inward in each cylinder bore, the cam surface being spaced radially from the outer periphery of the cylinder barrel to define an inlet manifold; wall means closing the opposite ends of the inlet manifold; a reservoir located within one of the members and encircling its axis of rotation, the outer margin of the reservoir being at a greater radius from the axis of rotation than the outer margin of the inlet manifold; an inlet passage formed in each piston for connecting the associated cylinder bore with the inlet manifold; an inlet valve carried by each piston and serving to open the associated inlet passage for at least a portion of the outward stroke of the piston and to close the inlet passage during the inward stroke of the piston; a supply passage connecting the reservoir at a point adjacent its outer periphery with the inlet manifold at a point spaced radially inward from its outer margin; a pump driven by one of the members and located in the supply passage for forcing fluid from the reservoir to the inlet manifold; a discharge passage leading from each cylinder bore to the reservoir adjacent its inner periphery; and valve means movable in passage-opening and passage-closing directions for controlling flow through the discharge passages.

2. The hydraulic clutch defined in claim 1 in which the supply passage includes an annular portion defined by the outer peripheral surface of the cam ring and by a surface of the drive member; and in which the pump comprises a plurality of impeller blades carried by the drive member and positioned in said annular portion of the supply passage.

3. The hydraulic clutch defined in claim 2 including a reservoir by-pass passage connecting the discharge passages directly with the inlet manifold.

4. A hydraulic clutch comprising a first member of generally toroidal form having an opening through a portion of its inner peripheral wall; means supporting the first member for rotation about its axis; a cylinder barrel connected with one side wall of the first member and positioned in said opening, the cylinder barrel being coaxial with the first member; a plurality of radial cylinder bores formed in the cylinder barrel; a piston reciprocable in each cylinder bore; a second member having a longitudinal portion coaxial with the first member and supported for rotation by the inner peripheral wall of the first member, and a radial portion spaced longitudinally from the cylinder barrel and projecting into the first member through said opening; a cam ring carried by the radial portion of the second member and encircling the cylinder barrel, the cam ring being spaced longitudinally from the side wall of the first member to which the cylinder barrel is connected and having a generally elliptical inner peripheral surface spaced radially from the cylinder barrel and arranged to engage the pistons at their outer ends and an outer peripheral surface spaced radially from the outer peripheral wall of the first member; a plurality of liquid impelling blades carried by the outer peripheral wall of the first member and positioned in the annular space between this wall and the outer peripheral surface of the cam ring, the blades being arranged to direct liquid toward the side wall to which the cylinder barrel is connected; at least one opening formed through the radial portion of the second member and positioned radially outward of the inner peripheral wall of the first member; an inlet passage formed in each piston for connecting the cylinder bore with the radial space between the cylinder barrel and the cam ring, the passage having an opening through the surface of the piston so arranged that it is closed and opened by the outer peripheral edge of the cylinder bore as the piston reciprocates; discharge passages formed in the cylinder barrel, one discharge passage leading from each cylinder bore to the longitudinal space between the radial portion of the second member and the cylinder barrel; and valve means carried by the cylinder barrel for controlling flow through the discharge passages.

References Cited in the file of this patent

UNITED STATES PATENTS

| | | |
|---|---|---|
| 1,105,792 | Jessen | Aug. 4, 1914 |
| 1,317,415 | Baker et al. | Sept. 30, 1919 |
| 1,474,971 | Kramer | Nov. 20, 1923 |
| 2,120,293 | Messenger | June 14, 1938 |
| 2,482,313 | Bascle | Sept. 20, 1949 |
| 2,498,801 | Fraser | Feb. 28, 1950 |
| 2,681,713 | Chambers | June 22, 1954 |
| 2,894,369 | Zierick | July 14, 1959 |

FOREIGN PATENTS

| | | |
|---|---|---|
| 545,857 | France | Aug. 2, 1922 |